United States Patent [19]
Ochi

[11] Patent Number: 4,589,028
[45] Date of Patent: May 13, 1986

[54] DEFECT CONCEALING IMAGE SENSING DEVICE

[75] Inventor: Shige Ochi, San Jose, Calif.

[73] Assignee: Fuji Photo Film Co., Ltd., Kanagawa, Japan

[21] Appl. No.: 555,919

[22] Filed: Nov. 29, 1983

[51] Int. Cl.⁴ ............................................. H04N 3/14
[52] U.S. Cl. ................................................... 358/213
[58] Field of Search ............... 358/213, 212, 209, 163, 358/167; 357/24 LR; 250/578

[56] References Cited

U.S. PATENT DOCUMENTS

| | | | |
|---|---|---|---|
| 3,676,590 | 6/1972 | Weimer | 358/213 |
| 3,959,047 | 5/1976 | Alberts et al. | 357/54 |
| 4,250,570 | 2/1981 | Tsang et al. | 307/441 |
| 4,400,734 | 8/1983 | Davy | 358/213 |

Primary Examiner—Gene Z. Rubinson
Assistant Examiner—Stephen Brinich
Attorney, Agent, or Firm—Sughrue, Mion, Zinn, Macpeak & Seas

[57] ABSTRACT

A method for concealing defects in a video output signal from a photosensor array and an image sensing device operating in accordance with such a method in which positions of output lines from the array having an associated defect are marked by blowing respective fuses. Prior to scanning the normal photosensitive elements of the array, a line of dummy photosensing elements is activated and the resulting data patterns stored in a shift register. Subsequently, while the active photosensing elements are being read out, the shift register is operated to circulate the data stored therein. The output of the shift register is used to control connections to a video output terminal. Specifically, in the case that the respective output line from the array has no associated defect, the then-present output from the array is applied to the video output terminal, and in the case that the respective output line has an associated defect, the output from an adjacent line is applied to the video output terminal. Defects in the video output are thereby concealed.

6 Claims, 3 Drawing Figures

DEFECT CONCEALING IMAGE SENSING DEVICE

BACKGROUND OF THE INVENTION

The invention pertains to a semiconductor image sensing device. More particularly, the invention pertains to a semiconductor image sensing device in which defective segments caused by inoperative lines of photosensing elements are eliminated from the video output signal produced by the device.

With reference now to FIG. 1, a prior art image sensing device of the same general type to which the invention pertains is illustrated. The device includes a pixel (picture element) array 12 composed of a number of lines and columns of pixels 13. Each pixel 13 may be represented schematically as a photosensitive diode and an FET transistor. The gate electrodes of the FET transistors of the pixels 13 are connected in rows to corresponding ones of vertical lines 14, while the drain electrodes of the FETs are connected in columns to respective horizontal lines 15. (Although in the drawing the vertical lines 14 and the horizontal lines 15 extend in the horizontal and vertical directions, respectively, they are properly termed vertical and horizontal lines since the vertical lines 14 are scanned in the vertical direction and the horizontal lines 15 are scanned in the horizontal direction.) Each of the vertical lines 14 is connected to a corresponding output line from a vertical shift register 11. If desired, an interlace circuit can be provided between the vertical shift register 11 and the array 12 to effect interlaced scanning if the array is used in a television camera.

The horizontal lines 15 are connected to source electrodes of respective output switch FETs 16. The drain electrodes of the FETs 16 are connected in common to the input terminal of an amplifier 18, and the gate electrodes of the FETs 16 are coupled to corresponding outputs of a horizontal shift register 17. The output of the amplifier 18 is applied to the input of a fixed-pattern noise suppressing circuit 19. The output signal from the device is formed at the output of the noise suppressing circuit 19.

In operation, starting from a reset state, when the pixel array 12 is exposed to an image to be sensed, the diode portions of the pixels 13 conduct in an amount determined by the intensity of the light in respective portions of the image. Accordingly, the capacitance associated with each of the pixels 13 is discharged in an amount determined by the intensity of the light in the corresponding portion of the image being sensed. After the pixel array 12 has been exposed to light, the vertical shift register 11 is activated by a clock signal $\phi_V$ to shift a pulse through the shift register one position at a time. Accordingly, the vertical lines 14 receive an activating signal in sequence. Activation of each of the vertical lines 14 in this manner causes the FETs of the associated row of pixels 13 to be turned on, thus transferring the charge from the capacitance of each pixel 13 to the corresponding one of the horizontal lines 15.

The horizontal shift register 17 is then activated to shift a pulse therethrough, one position for each pulse of a horizontal clocking signal $\phi_V$, thereby turning on the output switch FETs 16 one at a time and connecting the horizontal lines 15 one at a time to the input of the amplifier 18. The horizontal shift register 17 makes one complete cycle for activation for each of the vertical lines 14. The amplifier 18 boosts the voltage on its input terminal produced by the sequential transfer thereto of the charge packets from the various pixels 13 to thereby produce a video signal. Fixed-pattern noise is suppressed by the fixed-pattern noise suppressing circuit 19 in a known manner.

The prior art arrangement illustrated in FIG. 1 would perform quite well in the case that the entire pixel array 12 contains no defects. However, in the case, for example, that one of the horizontal lines 15 is short circuited to ground so that no output signal can be generated during the read-out period for that line, a vertical streak will appear in the reproduced image at a position corresponding to the position of the defective horizontal line. With no provision being made to conceal such defects, the pixel array would have to be rejected.

Accordingly, it is an object of the present invention to provide a method for concealing defects in a video output signal produced by an image-sensing array.

Further, it is an object of the present invention to provide an image sensing device in which defects in an image-sensing array are effectively concealed.

SUMMARY OF THE INVENTION

These, as well as other objects of the invention, are met by a method for concealing defects in a video output signal from an image-sensing array including steps of scanning the array sequentially to produce an uncorrected video output signal, and in the case that a line being read out is defective, eliminating from the video output signal a segment thereof corresponding to the defective line and substituting output signal segment produced by reading out at least one adjacent nondefective line to thus produce corrected video output signal. A "segment" of the output signal as used herein means a time period of the output signal corresponding to the read-out period of a line of the array producing the respective portion of the output signal. Preferably, the defective line is disconnected, prior to the scanning of the array, from an output terminal on which the uncorrected video output signal is produced. This may be done by blowing a fuse connecting the defective line to this output terminal.

The step of substituting may be performed by replacing the segment of the uncorrected output signal corresponding to the defective line with an output signal segment from a line read out immediately previous to the defective line. In a case where the lines of the array are scanned two at a time, the step of substituting may be implemented simply by boosting the output signal when one of two lines being simultaneously read out is defective. In either case, an indication is stored of which lines of the array are defective. During the scanning of the array, the substitution of one segment for another or the boosting of the output signal can be done readily in accordance with the stored information.

Further, the invention can be practiced by an image sensing device including a photosensor array composed of first and second sets of conductors with the conductors within sets being parallel with one another and being perpendicular between sets and with photosensing elements being arranged in lines at intersections between conductors of the first and second sets, means for sequentially activating the conductors of the first set to read out image information sensed by the associated photosensing elements onto the conductors of the second set one line at a time, means for sequentially coupling the conductors of the second set to an array output terminal to produce a video output signal, means for storing information indicative of which of the conductors of the second set have an associated defect, and means for substituting for segments of the video output signal corresponding to conductors of the second set having an associated defect a signal segment corresponding to an adjacent conductor of the second set which is not defective. By an "associated defect" is meant that the respective conductor of the second set may itself be defective, such as being open or short circuited to ground, or one or more of the photosensing elements associated with that conductor are defective.

Preferably, the photosensor array includes a line of dummy photosensing elements (pixels), with one of the dummy photosensing elements being provided for each conductor of the second set. This line of dummy photosensing elements is coupled to the activating means to be activated thereby in sequence with the conductors of the first set. By "dummy" photosensing element is meant a semiconductor device or structure which is similar in arrangement to an actual photosensing element but which is not sensitive to light.

Fuses may be connected between the respective conductors of the second set and an array output terminal. The storing means may be a shift register and a first switch for selectively coupling the input of the shift register to the array video output terminal when the line of dummy photosensing elements is being read out and to the output of the shift register otherwise. In one preferred embodiment, a delaying circuit, having a delay time equal to the scanning time between adjacent conductors of the second set, is provided having an input coupled to the array video output terminal. In this case, a second switch, operating in response to the output of the shift register, selectively couples to a device video output terminal the array video output terminal in the case that the shift register output indicates no defect, and the output of the delaying circuit in the case that the output of the shift register indicates that the signal on the array video output terminal is being received from a conductor having an associated defect. In another preferred embodiment, in a case where the conductors of the second set are paired in the array, a variable gain amplifier is provided having a signal input coupled to the array video output terminal, an output coupled to a device video output terminal, and a gain control input coupled to the output of the shift register.

DESCRIPTION OF THE PREFERRED EMBODIMENTS

Figure 2:
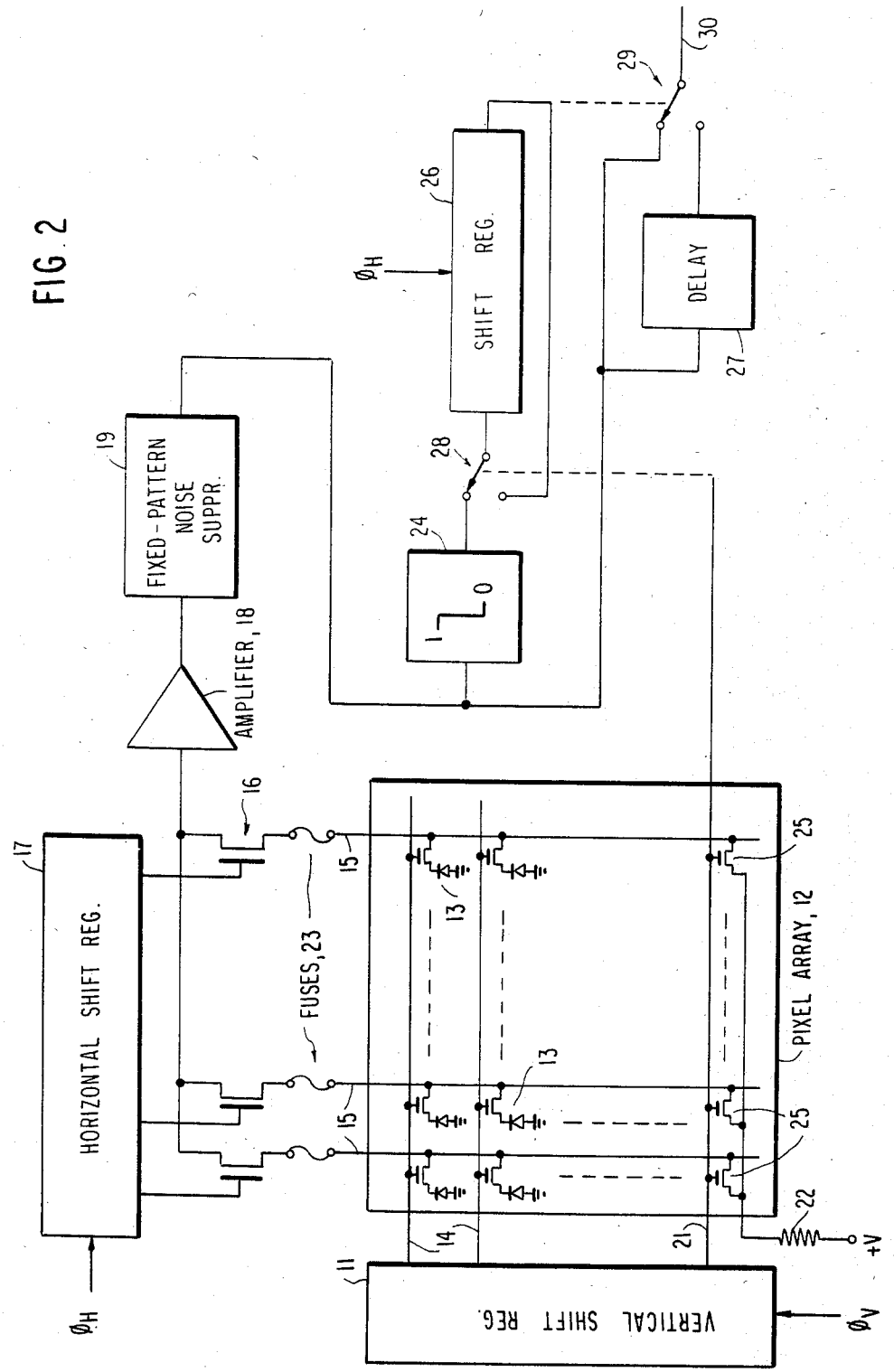
FIG. 2 is a diagram showing a first preferred embodiment of an image sensing device of the invention.

Referring now to FIG. 2, a first preferred embodiment of an image sensing device constructed in accordance with the teachings of the present invention is shown. In accordance with the invention, a line of dummy pixels 25 is provided in the first row of the pixel array 12. (The first row is at the bottom because the image being sensed is ordinarily inverted by an optical system.) This line of dummy pixels 25 takes the form of FETs having a structure similar to the FETs of the active pixels 13, but without the photosensitive diode structure. The drains of the FETs of the dummy pixels 25 are coupled to respective ones of the horizontal lines 15, their sources are connected in common to a source of a positive potential $+V$ through a pull-up resistor 22, and their gates are connected via a common vertical line to the first output (first bit position) of the vertical shift register 11.

Further, fuses 23 are provided in series between the horizontal lines and their respective output switch FETs 16. The output of the fixed-pattern noise suppressing circuit 19 is applied to the input of a level detector 24, the function of which is to produce a binary output signal having an output in the "1" state when the output from the fixed-pattern noise suppressing circuit 19 is above a certain level and a "0" otherwise. The output of the fixed-pattern noise suppressing circuit 19 is also applied to the input of a delay circuit 27, the delay time of which is equal to the period of the clock signal $\phi_H$ which operates the horizontal shift register 17.

A first switch 28 selectively connects the input of a shift register 26 to either the output of the level detector 24 or to its own output. The shift register 26 is clocked by the same clock signal, $\phi_H$, as the horizontal shift register 17. The position of the switch 28, which may be readily implemented with an analog switch or a logic circuit, is controlled by the output (last bit position) 21 of the vertical shift register 11 which activates the line of dummy pixels 25. More specifically, when the output 21 from the vertical shift register 11 is activated and the line of dummy pixels 25 is being read out, the switch 28 is connected in the position shown to thus couple the output of the level detector 24 to the input of the shift register 26. While the remaining rows of the array 12 are being scanned by the vertical shift register 11, the switch 28 connects the output of the shift register 26 to its input so that data contained therein can be circulated, once for each cycle of the horizontal shift register 17.

A second switch 29 is provided, the position of which is controlled by the output bit from the shift register 26 to selectively couple either the output of the fixed-pattern noise suppressing circuit or the output of the delay circuit 27, via a line 30, to a device video output terminal.

In operation, the device of FIG. 2 is first operated to determine which, if any, of the horizontal lines 15 have an associated defect. For those of the horizontal lines 15 which have an associated defect, the respective fuses 23 are blown. The device may then be assembled and employed in the system of which it forms a part, for instance, a television camera or electronic still camera.

Each time that the pixel array 12 is scanned in ordinary operation the output 21 from the vertical shift register 11 is the first to receive a scanning pulse. While the line of dummy pixels 25 is thereby activated, the signals applied to the sources of the output switch FETs 16 will be at one of two levels depending upon whether the respective fuse 23 is blown or not. While the horizontal shift register 17 is operating to connect the horizontal lines 15 in sequence through the amplifier 18 and fixed-pattern noise suppressing circuit 19 to the level detector 24, the output of the level detector 24 will be, for instance, in the "0" state when there is no defect associated with respective horizontal line 15 and in the "1" state when the horizontal line 15 has an associated defect. Thus, at the end of the cycle of the horizontal shift register 17 performed while the line of dummy pixels 25 is activated by the vertical shift register 11, the shift register 26 will be filled with data bits which indicate which of the horizontal lines 15 have an associated defect.

When the vertical lines 14 of the array are subsequently scanned by the vertical shift register 11, the data of the shift register 26 will be circulated once for each row of pixels, that is, once for each cycle of the horizontal shift register 17. For each state of the shift register 26, that is, for each pulse of $\phi_H$, a second switch 29 will be set in the position shown in the case that the respective horizontal line 15 (the horizontal line which produced the bit then present in the last bit position of the shift register 26) has no associated defect, and in the position connecting the line 30 to the output of the delay circuit 27 in the case that the respective horizontal line 15 has an associated defect. This has the effect of substituting, in the output video signal on the line 30, the output from an adjacent column of pixels 13 for the output of a column having an associated defect.

Figure 3:
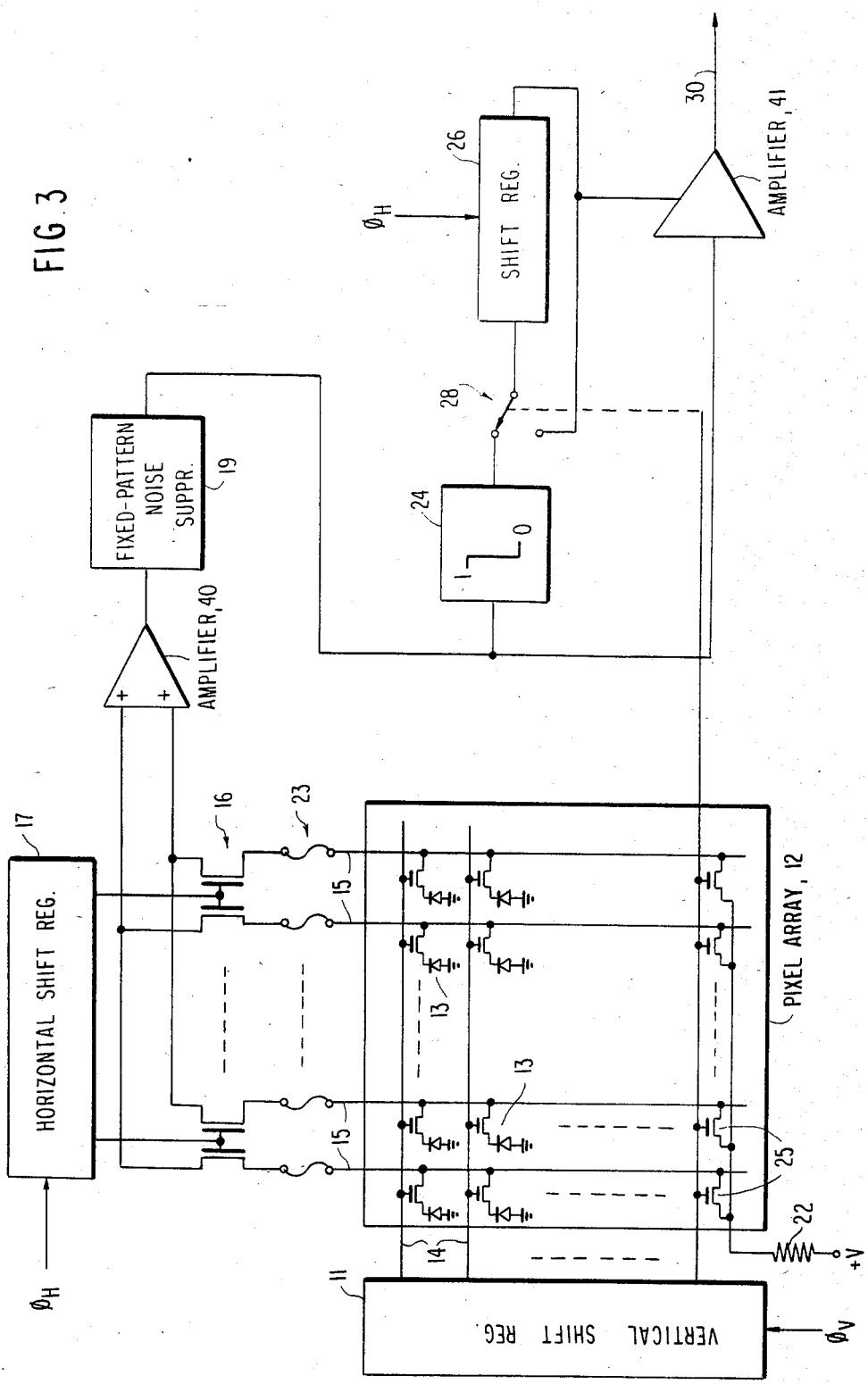
FIG. 3 is a diagram showing a second preferred embodiment of an image sensing device of the invention.

A second preferred embodiment of the invention is illustrated in FIG. 3. In this case, the horizontal lines 15 of the array 12 are paired so that pairs of two horizontally adjacent pixels respond to essentially the same image information to thus produce double the output signal amplitude. In this case, the output switch FETs 16 are also paired with the gates of the FETs of each pair being connected to a single output from the horizontal shift register 17. The drains of the output switch FETs 16 are connected in pairs as shown to respective inputs of a two-input amplifier 40.

A fixed-pattern noise suppressing circuit 19 is provided as before, as is a level detector 24, first switch 28 and shift register 26. Further, a variable gain amplifier 41 is provided having a gain control input coupled to the output of the shift register 26. The input of the amplifier 41 is supplied by the output of the fixed-pattern noise suppressing circuit 19. The output of the amplifier 41 is connected to the device video output terminal via the line 30.

Operationally, the array is tested and the fuses 23 are blown in the same manner as before. Also, scanning of the pixel array 12, both for the line of dummy pixels 25 and for the active pixels 13, takes place in the same manner as in the previously described embodiment. Further, the shift register 26 is filled with bits which indicate which of the horizontal lines 15 have an associated defect in the same manner as in the first-described embodiment.

In operation, when the output of the shift register 26 indicates that there is no defect associated with either of the two horizontal lines 15 then supplying the input to the amplifier 41, the gain of the amplifier 41 is set to a normal level. However, when the output of the shift register 26 indicates that one of the respective horizontal lines 15 has an associated defect, the gain of the amplifier 41 is doubled. That is, when the output of the shift register 26 indicates that one of the two horizontal lines 15 then supplying the input to the amplifier 41 has an associated defect, because the signal level at the input of the amplifier 41 will only be half that when neither of the pair of horizontal lines 15 has an associated defect, the gain of the amplifier 41 is doubled to maintain the video output of the signal on the line 30 at the proper level at all times.

Figure 1:
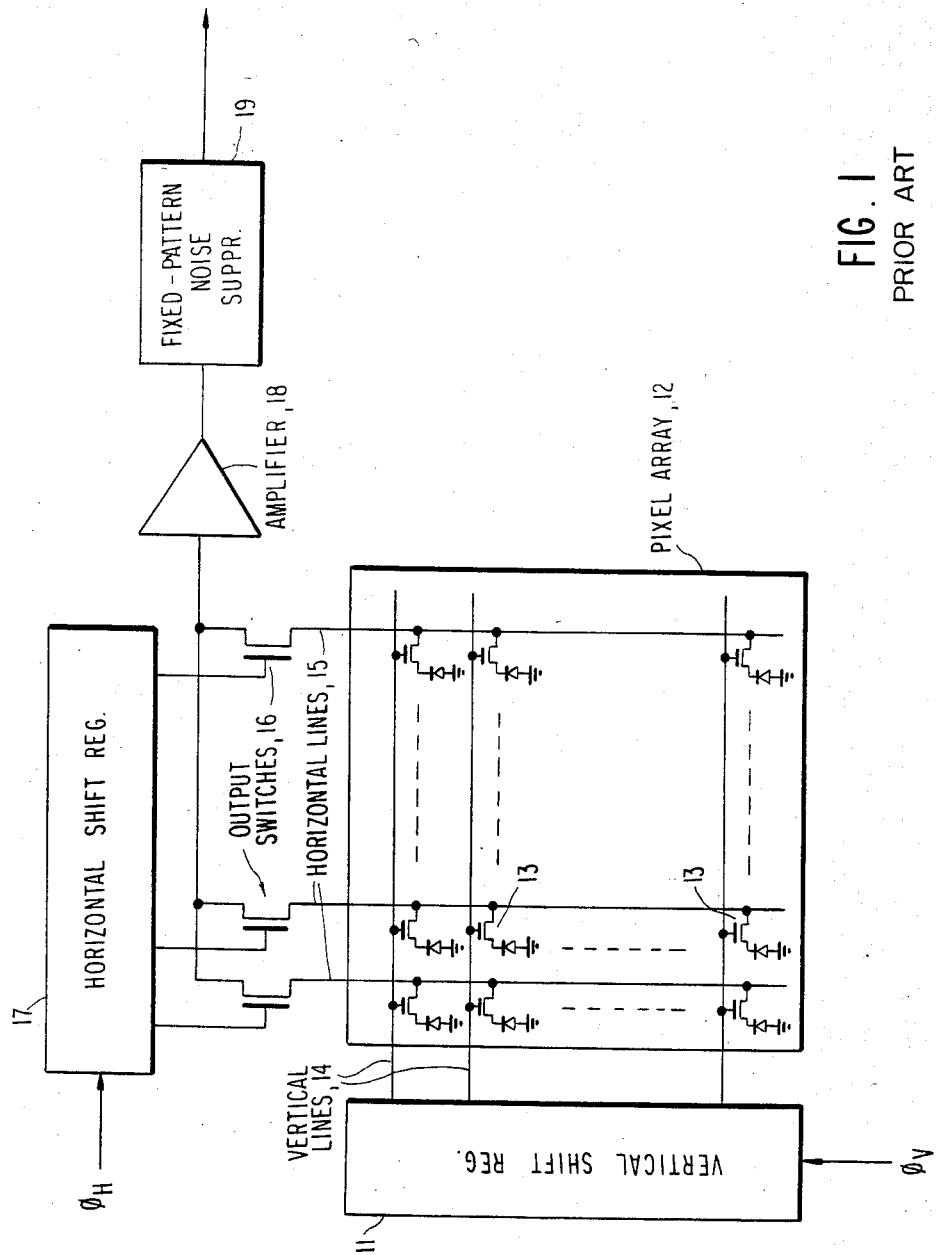
FIG. 1 is a diagram showing a prior art image sensing device.

This completes the description of the preferred embodiments of the invention. Although preferred embodiments have been described, it is believed that numerous modifications and alterations thereto would be apparent to one of ordinary skill in the art without departing from the spirit and scope of the invention. For example, the invention can be practiced by adding to the device of FIG. 1 a shift register having preset inputs connected through fuses to a reference terminal with ones of these fuses being blown corresponding to positions of horizontal lines having an associated defect. As the array is scanned, the shift register is read out and its output emloyed to control switching between the output of a delay circuit and the array output terminal, similar to the embodiment of FIG. 2.

I claim:

1. A method for concealing defects in a video output signal produced by scanning a photosensor array, comprising the steps of:
   scanning said array sequentially to produce said video output signal;
   if any array line being scanned is defective, substituting in said uncorrected video output signal for a segment of said output signal corresponding to said defective line an output signal segment produced by scanning an adjacent line to said defective line to thereby produce a corrected video output signal;
   disconnecting, prior to scanning said array, said defective line from an output terminal at which said uncorrected video output signal is produced; and
   wherein said step of disconnecting comprises blowing a fuse connecting said defective line to said output terminal;
   wherein said step of substituting further comprises detecting which, if any, fuses connecting respective lines of said array to said output terminal are blown; storing information indicative of which of said fuses are blown in response to said step of detecting; and, for scanning of each line of said array and in response to said stored information, replacing said segment of said output signal corresponding to said defective line with an output signal segment produced by scanning an adjacent line to said defective line.

2. The method of claim 1, wherein said step of detecting comprises scanning a set of dummy photosensing elements in said array, one of said dummy elements being provided for each of said lines connected to said output terminal through a fuse, and wherein said step of storing comprises storing a representation of said uncorrected output signal during said scanning of said dummy elements.

3. An image sensing device comprising:
   a photosensor array comprising first and second sets of conductors, conductors of said first and second sets being parallel within said sets and perpendicular between said sets, and photosensing elements arranged in lines at intersections between said conductors of said first and second sets;
   means for sequentially activating said conductors of said first set to read out image information sensed by said photosensing elements onto said conductors of said second set one line of said photosensing elements at a time;
   means for sequentially coupling said conductors of said second set to at least one array output terminal to produce an uncorrected video output signal;
   means for storing information indicative of which, if any, of said conductors of said second set have an associated defect; and
   means, operating in response to said storing means, for substituting for segments of said video output signal corresponding to conductors of said second set having an associated defect a signal segment corresponding to an adjacent conductor of said second set to thereby produce a corrected video signal; and wherein said photosensor array further comprises a line of dummy photosensing elements, one of said dummy photosensing elements being provided for each conductor of said second set, said line of dummy photosensing elements being coupled to said activating means to be activated in sequence with said conductors of said first set.

4. The image sensing device of claim 3, further comprising a plurality of fuse means, one said fuse means being coupled between each conductor of said second set and said array output terminal.

5. The image sensing device of claim 4, wherein said storing means comprises a shift register and first switch means for coupling an input of said shift register to said array output terminal when said line of dummy photosensing elements is being read out and to an output of said shift register otherwise.

6. The image sensing device of claim 5, further comprising delaying means having an input coupled to said array output terminal and second switch means operating in response to said output of said shift register for coupling said array output terminal to a device output terminal when a state of said output of said shift register is indicative of a good conductor of said second set, and an output of said delaying means to said device output terminal when a state of said output of said shift is indicative of a conductor of said second set having an associated defect.

* * * * *